United States Patent
Wullschleger

(12) 
(10) Patent No.: US 6,506,242 B1
(45) Date of Patent: *Jan. 14, 2003

(54) ADHESIVE VARNISH TO RECEIVE POWDERED PIGMENTS

(75) Inventor: Raffael Wullschleger, Uetikon am See (CH)

(73) Assignee: RAFKA GmbH, Uetikon am See (CH)

( * ) Notice: Subject to any disclaimer, the term of this patent is extended or adjusted under 35 U.S.C. 154(b) by 42 days.

This patent is subject to a terminal disclaimer.

(21) Appl. No.: 09/692,425

(22) Filed: Oct. 19, 2000

Related U.S. Application Data

(63) Continuation of application No. 09/297,250, filed as application No. PCT/IB98/01252 on Aug. 17, 1998, now Pat. No. 6,168,657.

(30) Foreign Application Priority Data

Sep. 1, 1997 (CH) ................................. 204-97

(51) Int. Cl.[7] ...................... C09D 191/00; C09D 193/00
(52) U.S. Cl. ...................................... 106/227
(58) Field of Search ......................... 106/227

(56) References Cited

U.S. PATENT DOCUMENTS 6,168,657 B1 * 1/2001 Wullschleger .............. 106/227

FOREIGN PATENT DOCUMENTS

| | | |
|---|---|---|
| DE | 3 020 381 | 12/1980 |
| DE | 3 740 972 | 6/1989 |
| EP | 33 457 | 9/1993 |
| EP | 45 851 | 9/1993 |
| EP | 562 329 | 9/1993 |
| FR | 2 352 856 | 1/1978 |
| GB | 474 746 | 11/1937 |
| JP | 54 081337 | 9/1993 |
| JP | 60 80919 | 3/1994 |
| SU | 640 982 | 1/1979 |

* cited by examiner

*Primary Examiner*—David Brunsman
(74) *Attorney, Agent, or Firm*—Shoemaker and Mattare

(57) ABSTRACT

An adhesive varnish, adapted to retain powdered pigments, contains colophony and pre-treated linseed oil in a solvent system including primarily naphtha of the boiling range ~80° through ~160° C. and technical ethanol. A two-component system comprising the adhesive varnish and powdered pigment serves for temporary coloring and/or lettering of substrates made of glass, polished stone, glazed ceramic, surfaces of baked lacquer and synthetic or natural materials, in particular display windows.

18 Claims, No Drawings

ADHESIVE VARNISH TO RECEIVE POWDERED PIGMENTS

This application is a continuation of application 09/297,250, filed Apr. 27, 1999. Now U.S. Pat. No. 6,168,657, which is a 371 of PCT/GB98/01252 filed Aug. 17, 1998.

BACKGROUND OF THE INVENTION

This invention relates to an adhesive varnish to receive powdered pigments. The present invention concerns an adhesive varnish, a two-component system comprising an adhesive varnish and powdered pigments, a method for applying a powdered pigment to a substrate and the combination of a two-component system with a substrate.

Paints are coating materials of liquid to paste consistency which are applied by brushing, spraying, dipping, or pouring on the surfaces or objects to be painted and which, through physical and/or chemical drying, yield a firmly adhering, cohesive layer on the substrate, for the most part a very thin layer of paint film. Paints consist of suitable organic film formers and plasticizers in a solution or a mixture of solutions, possibly with the addition of siccatives (drying agents) or even pigments. Pigmented paints are referred to as varnish paints.

Important paints are now described specifically:

Oil varnishes are solutions of natural or synthetic resins and drying oils with additions of siccatives in volatile organic solvents, such as oil of turpentine or naphtha. Drying oils used in addition to wood oil are primarily linseed oil, also tall oil, castor oil, oiticica oil, and perilla oil. The oils are concentrated by heating to form bodied oils, whereby groups of two to three oil molecules generally form.

The term synthetic resin paints, usually connotes air-and-oven dried alkyd resin paints, also with additions of other resin types. In a broader sense, synthetic resin paints are all paints or varnish paints with synthetic resins as film formers. These include, for example, urea, melamine, and phenolic resins and other plastic materials for paints. Essential in all reported cases is thus the fact that the paint is applied either without pigment powder, i.e., solid pigment mixtures, or already contains these. Painting with subsequent independent addition of pigments has not been taught.

SUMMARY OF THE INVENTION

An object of the invention is for the adhesive varnish to receive powdered pigments.

A adhesive varnish according to the invention contains colophony and drying oil, in particular pre-treated linseed oil in a solvent system which contains primarily hydrocarbons, in a particular naphtha with a boiling range of 80° C. to 160° C. and ethanol, in particular technical ethanol.

The colophony is preferably technically pure and is present in the mixture in a concentration of 14 wt-% through 36 wt-% in particular 24 wt-% through 30 wt-%; the pre-treated linseed oil is formally pre-polymerized under air intake and is present in the mixture at a rate of 8 wt-% through 20 wt-%, in particular 10 wt-% through 16 wt-%.

It is important that the solvent system consist primarily of naphtha with a boiling range of 80° C. to 160° C., in particular 100° C. to 140° C. and includes as a second component technical, possible denatured ethanol at a rate of 1 wt-% through 10 wt-% based on the system.

The primary role of the adhesive varnish specified above applied to a substrate—possibly in the form of symbols, letters, or the like—is to receive even a plurality of powdered pigments, whereby the powdered pigment (s) is (are) applied to the adhesive varnish freely or by means of precut films, in particular brushed on or blown on.

The powdered pigment adhesive resin layer can be protected by means of a transparent lacquer coat or film.

The pigmented adhesive resin layer can subsequently be completely removed easily by means of a mixture of ethanol and water, in particular by a mixture of technical grade ethanol and water. Washing off using known cleaners, in particular biodegradable cleaners, is also possible.

The application of said two-component system, in particular said resin-powdered pigment system, according to the invention serves for colored drawing and/or writing on substrates of glass, stone in particular polished stone, ceramic, in particular glazed ceramic, but also on baked lacquer and synthetic or natural material surfaces, in particular for temporary colored writing on display windows.

DESCRIPTION OF THE PREFERRED EMBODIMENT (S)

The invention is exemplified by the two embodiments described below.

EXAMPLE 1

A mixture of 4 parts (by weight) naphtha having a boiling range of 100° C. to 140° C., 2 parts colophony, 1 part of thermally pre-treated linseed oil, and 0.2 parts technical ethanol was homogenized under agitation at room temperature. The liquid preparation could be easily applied to clean glass by means of a brush wrapped with material or cotton; the adhesion was excellent. Even before the adhesive varnish was completely dry, it was possible to apply a plurality of powdered pigments ("theater colors") by means of a swab to various parts of the paint-substrate, without them "smearing" in the process. These colors consisted of or included inorganic pigments such as rutile, iron, oxide black, iron oxide red, or umber, brighter colors include organic pigments such as benzidine yellow, monoazo yellow or phthalocyanine green with carriers such as zinc sulfide, barium sulfate, or calcite.

The pigment-paint, completely dried after some time, was then washed off residue free with a mixture of water and technical ethanol.

EXAMPLE 2

A composition analogous to that reported in Example 1, but with approximately 10% less naphtha, was applied outdoors on a display window at approximately 20° C. ambient temperature to an extent predefined by a film; after removal of the film virtually no curtaining of the adhesive varnish could be detected.

Powdered pigments were then blown onto this base in a horizontal layer arrangement. Relatively large lettering running upward at an angle in various horizontal colored strips was obtained, a very impressive advertising symbol.

Even after two weeks, the writing remained unchanged with regard to extent and color.

Through variation, in particular of the linseed oil content, it was possible to compensate adequately for the effect of the ambient temperature on the practical curing behavior of the adhesive varnish. Additional chemical and technical data concerning the major components of the adhesive varnish according to the invention are as follows:

Thermally pre-treated technical linseed oil:
Form: liquid
Color: yellow/brown
pH-value: neutral
Viscosity: 100–5000 mPa-sec (DIN 53015, 20° C.)
Melting temperature: ~0° C.
Boiling temperature: ~250° C. (1 kPa)
Density: at 20° C. approximately 0.930 g/cm$^3$
Solubility in water: virtually insoluble
Soluble in other solvents: alcohol, hexane
Technical colophony (resins of various types of the species Pinus L.)
Solubility in water: insoluble
Soluble in other solvents: ethanol, ether.
Ethanol, technical, denatured (content: ethanol ~92 wt-%, water ~6 wt-%, methyl ketones ~2 wt-%):
pH value: at g/l H0
Viscosity: dynamic (20° C.) 1.2 mPa-sec
Boiling temperature: 78° C.
Vapor pressure: (20° C.)-59 mbar
Density: (20° C.) 0.81 g/cm$^3$
Solubility in water: soluble
Naphtha/boiling range ~100° C.–140° C. (primarily C -alkanes):
Melting point: <20° in
Boiling range: ~98° C. through ~140° C.
Density at 20° C.: 0.71 through 0.74 g/cm$^3$
Solubility in water at 20° C.: <1 g/l

I claim:

1. An adhesive varnish comprising colophony, a drying oil, and a solvent, wherein the solvent comprises a hydrocarbon and technical alcohol.

2. An adhesive varnish as claimed in claim 1, wherein the colophony comprises 14% through 36% by weight of the solvent.

3. An adhesive varnish as claimed in claim 2, wherein the hydrocarbon comprises naphtha having a boiling point in a range from about 80° C. through about 160°.

4. An adhesive varnish as claimed in claim 3, wherein the hydrocarbon comprises naphtha having a boiling point in a range from about 80° C. through about 160° C.

5. A two-component composition comprising:
   a) a varnish comprising colophony, a drying oil, and a solvent, wherein the solvent comprises a hydrocarbon and technical ethanol; and
   b) a powdered pigment.

6. A system as claimed in claim 5, wherein the powdered pigment comprises an organic pigment.

7. A system as claimed in claim 5, wherein the powdered pigment comprises an inorganic pigment.

8. A system as claimed in claim 5, wherein the pigment comprises rutile, iron oxide black, iron oxide red, umber, benzidine yellow, monoazo yellow, or phthalocyanine green.

9. A system as claimed in claim 5, wherein the powdered pigments further comprises zinc sulfide, barium sulfate, or calcite.

10. A system as claimed in claim 5, in combination with a substrate upon which the adhesive varnish is applied.

11. A method for applying a powdered pigment to a substrate, the method comprising:
    a) applying an adhesive varnish to a substrate; and
    b) applying a powdered pigment to the varnish on the substrate, wherein after step (b) the varnish with the pigment can be removed from the substrate.

12. A method as claimed in claim 11, wherein after step (b) the varnish with the powdered pigment can be removed from the substrate by means of a conventional cleaner.

13. A method as claimed in claim 11, wherein after step (b) the varnish with the powdered pigment can be removed from the substrate by means of a mixture of ethanol and water.

14. A method as claimed in claim 11, wherein the substrate comprises glass, stone, ceramic, synthetic material or lacquer.

15. A method as claimed in claim 11, wherein the adhesive varnish in step (a) is applied freely or by means of precut films on the substrate.

16. A method as claimed in claim 11, wherein the adhesive varnish in step (a) is applied in the form of letters or symbols on the substrate.

17. A method as claimed in claim 11, wherein step (b) produces colored lettering on the substrate; and wherein the substrate is a window.

18. A method for applying a powdered pigment to a substrate, the method comprising:
    a) applying an adhesive varnish to a substrate; and
    b) applying a powdered pigment to the substrate,
    c) whereby pigment is bonded to the substrate by the varnish, and then
    d) removing excess pigment from the substrate.

* * * * *